J. A. SEEDE.
WELDING SYSTEM.
APPLICATION FILED SEPT. 12, 1917.

1,289,932.

Patented Dec. 31, 1918.

Inventor:
John A. Seede,
by Albert G. Davis
His Attorney.

UNITED STATES PATENT OFFICE.

JOHN A. SEEDE, OF SCHENECTADY, NEW YORK, ASSIGNOR TO GENERAL ELECTRIC COMPANY, A CORPORATION OF NEW YORK.

WELDING SYSTEM.

1,289,932.  Specification of Letters Patent.  Patented Dec. 31, 1918.

Application filed September 12, 1917. Serial No. 190,885.

*To all whom it may concern:*

Be it known that I, JOHN A. SEEDE, a citizen of the United States, residing at Schenectady, in the county of Schenectady, State of New York, have invented certain new and useful Improvements in Welding Systems, of which the following is a specification.

The present invention comprises an electric welding system and has for its object the provision of means whereby a welding arc may be supplied with current from a device having an inherent regulating characteristic suitable for welding while avoiding the deleterious effect of an initial rush of current prior to the establishment of welding conditions.

In accordance with my invention an energy-consuming device, preferably a resistance, is included in the welding circuit prior to the establishment of a welding arc, and means is provided for automatically removing said device from the welding circuit when the welding arc is established. My invention also includes in one of its aspects a welding system provided with a constant current generator having a separately excited field winding which is energized simultaneously with the insertion of a resistance in the shunt field winding upon the flow of welding current. This switching operation also activates a coil controlling a series resistance. The novel features will be pointed out with greater particularity in the accompanying claims.

Figure 1:
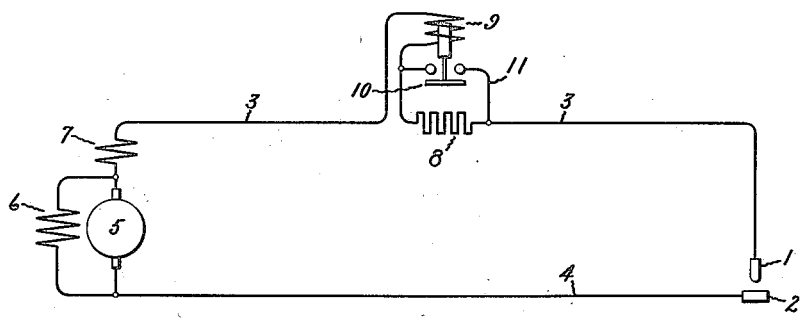
Figure 2:
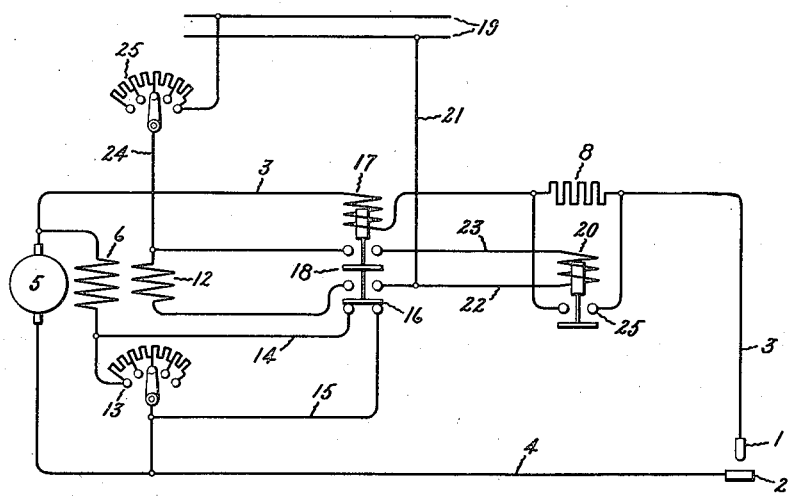

In the accompanying drawing, Figure 1 shows differentially wound direct current generator feeding a welding circuit and provided with a resistance which is automatically short-circuited upon the flow of welding current, and Fig. 2 shows a constant current generator provided with a separately excited field supplying a welding system embodying my invention.

Referring to Fig. 1, the welding electrodes 1 and 2 are connected by conductors 3 and 4 to a differentially-wound welding generator having an armature 5, a shunt field 6, and a series field 7. At the instant when current flow is established there is considerable energy stored within the generator which at the moment of starting the arc would be dissipated explosively in the arc. However, in accordance with my invention there is included in circuit with the conductor 3 an impedance 8 which suppresses the initial rush of electric energy. Current flow also immediately energizes the winding of a series magnet 9 which picks up its armature 10 and short circuits the impedance 8 through a conductor 11 and thereupon the regulation of the welding arc is entirely carried out by the inherent constant current characteristics of the generator. Although a resistance has been shown in Fig. 1 for the purpose of illustration, a reactance may be similarly used in either system.

In the system shown in Fig. 2, the welding electrodes 1, 2, are connected by conductors 3, 4, to a generator having an armature 5, a shunt field winding 6, and a separately excited field winding 12. In series with the shunt winding 6 is an adjustable resistance 13 which at the beginning of the operation is short circuited by the conductors 14 and 15. Included in circuit with these conductors is a contactor 16 connected to the armature of a magnet 17, the winding of which is in series with the welding supply conductor 3. Upon the flow of the welding current the magnet 17 picks up its armature, opening the short-circuit about the resistance 13 and thereby decreasing the flow of current through the winding 6. At the same time the contactor 16 connects the winding 12 to a separate source of current represented in this case by supply mains 19 and the contact 18 completes a circuit through a magnet 20. The magnet 20 is connected to one pole of the separate source of current 19, through conductors 21, 22 and to the other pole by the conductors 23 and 24. An adjustable resistance 25 in circuit with the conductor 24 serves to regulate the flow of current both through the separately excited field 12 and the magnet 20.

The result of this switching operation is to weaken the winding 6 by introducing the resistance 13, to supplement the weakened winding by means of the separately excited winding 12 and to close a switch 25, short-circuiting the resistance 8 in series with the welding arc. Therefore, in this system as well as in the system described in connection with Fig. 1, an initial rush of energy is prevented in the welding arc which is thereafter supplied with substantially constant current. I am aware it has been proposed to place a series resistance in circuit with a welding arc supplied with current from a constant potential source and to compensate for variations in the resistance of the welding arc by suitably adjusting either automatically or otherwise the value of the series resistance. This arrangement should not be confused with my present invention in which the series resistance is included in circuit only during a short interval of time during which excess energy in a supply circuit is dissipated and that thereupon the variations of resistance of the welding arc are compensated by the inherent regulation of the source of supply.

What I claim as new and desire to secure by Letters Patent of the United States, is:—

1. A welding system comprising the combination of welding electrodes, an energy supplying device connected to said electrodes having an inherent regulating characteristic suitable for welding, a current-consuming device in said welding circuit, and means for automatically removing said device when a welding arc has been struck.

2. A welding system comprising the combination of welding electrodes, a generator having an inherent regulating characteristic suitable for arc welding electrically connected to supply said electrodes with current, an impedance in circuit with said electrodes and automatic means for removing said impedance when a welding arc has been formed.

3. A welding system comprising the combination of welding electrodes, a generator having an inherent regulating characteristic suitable for arc welding connected to said electrodes, a resistance in circuit with said electrodes, and means responsive to current flow in said circuit for short-circuiting said resistance.

4. A welding system, comprising the combination of welding electrodes, an electric generator for supplying said electrodes with substantially constant current, a shunt-connected field winding for said generator, a second field winding, a separate source of excitation therefor, a resistance, means responsive to a flow of current for inserting said resistance in circuit with said shunt field and simultaneously connecting said second field winding to said separate source, a resistance in circuit with said welding electrodes, and means responsive to a flow of welding current to remove said resistance.

5. A welding system comprising the combination of welding electrodes, a generator electrically connected thereto having a shunt field winding, a short-circuited resistance connected thereto, a second accumulative field winding, a resistance in circuit with said welding electrodes, a short-circuiting switch for said resistance and switching means responsive to flow of welding current for including the shunt winding resistance in circuit with said winding and energizing both said second field winding and said short-circuiting switch for the resistance in the welding circuit.

In witness whereof, I have hereunto set my hand this 10th day of September 1917.

JOHN A. SEEDE.